United States Patent [19]

Korb et al.

[11] Patent Number: 4,918,820
[45] Date of Patent: Apr. 24, 1990

[54] FOLDABLE POCKET SAW

[75] Inventors: William B. Korb, Melrose, Conn.; Paul W. Koetsch, Springfield, Mass.

[73] Assignee: American Saw & Mfg. Company, East Longmeadow, Mass.

[21] Appl. No.: 302,376

[22] Filed: Jan. 27, 1989

[51] Int. Cl.⁵ .............................. B26B 3/06
[52] U.S. Cl. ...................... 30/161; 30/330; 30/155
[58] Field of Search ............... 30/155, 158, 160, 161, 30/330

[56] References Cited

U.S. PATENT DOCUMENTS 3,942,249  3/1976  Poehlmann .............. 30/161 X
4,148,140  4/1979  Lile ........................... 30/161
4,730,394  3/1988  Sonner, Jr. ................ 30/161

Primary Examiner—Frank T. Yost
Assistant Examiner—Willmon Fridie, Jr.
Attorney, Agent, or Firm—Chapin, Neal & Dempsey

[57] ABSTRACT

A foldable pocket saw has a handle with a mounting head extending from one end thereof. A blade mounting member is rotatably disposed on the mounting head with a saw blade removably attached thereto. A detent mechanism has a spring loaded pawl actuated by a button radially movable into and out of engagement with one of a plurality of circumferentially spaced, radially extending notches provided in the periphery of the rotatable blade mounting member for releasably locking the saw blade in any one of a plurality of positions relative to the handle.

5 Claims, 2 Drawing Sheets

FOLDABLE POCKET SAW

BACKGROUND OF THE INVENTION

This invention relates to a foldable, all purpose pocket saw in which the saw blade can be selectively moved and positively locked in any one of a plurality of radial positions with respect to the handle.

Saws and other cutting devices wherein the cutting blades are swung into the handle when the cutting blade is not being used have been known for some time, and are disclosed in the following prior U.S. Patents to Haag No. 784,674; Rohrer No. 1,362,143; Hoptner No. 4,271,592.

In Haag, a saw blade is disclosed which may be clamped into the handle or locked in one of several "open" positions. However, a wing nut 9 must be unscrewed and lever 15 must be depressed before the angular position of the blade can be changed.

Decarolis, Pat. No. 4,660,284, teaches a blade mounting head 52 pivotable on an axle or post 44 within the two mated sections (14 and 16) of a handle. The blade mounting arangement requires the use of tools to loosen a screw 56 threaded into a clamping piece 54 of complex configuration.

In the Rohrer patent, a saw blade may be folded within the handle or locked to one "open" position, but member 13 maintains the saw blade in an "open" position. There is no rotatable member and associated cap member to pivotably mount the shank of the saw to the handle.

The present invention is directed to a pocket saw of simple construction in which the saw blade may be locked in a "closed" position and in any one of several "open" or operative cutting positions by moving an actuator button which controls a detent mechanism. In particular, the pawl or dog of the detent mechanism is spring biased into engagement with circumferential spaced radial notches in the periphery of a rotatable member. The shaft or axle of the rotatable member and saw blade fastener comprise a single fastener and the saw blade is securely but removably affixed to the rotatable member without the use of tools.

The principal object of this invention is to provide an improved foldable pocket saw of simple but economical construction which enables rapid and easy movement of the saw blade between locking various "open" and "closed" positions with the blade being positively locked in each position.

Another object of this invention is to provide a pocket saw of the above type in which the blade is readily but securely affixed to a rotatable mounting member using a fastener which also serves as the axle for the rotatable member. The saw blade may be changed without the use of tools or disassembly of the handle.

The above and other objects and advantages of this invention will be more readily apparent from the following description read in conjunction with the accompanying drawings, in which.

DETAILED DESCRIPTION OF THE INVENTION

Figure 1:
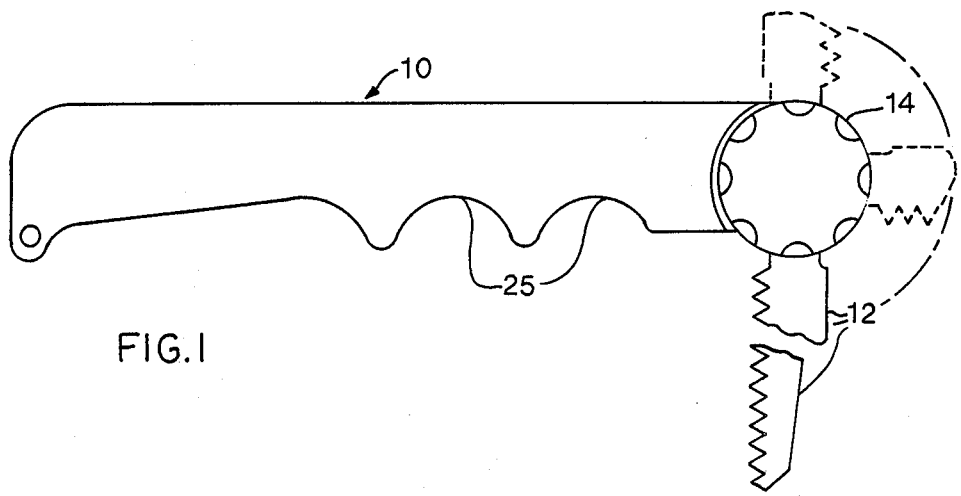
FIG. 1 is a side elevational view of the folding pocket saw showing the saw blade disposed in a plurality of different operative positions.

The folding saw comprises a handle 10, with a saw blade 12 pivotably disposed on one end thereof. The saw blade is pivotable from a "closed" position within a slot 17 in the handle to any one of a number of different cutting positions (FIG. 1). A movable actuator button 13 is provided to lock and unlock the blade mechanism for movement to and from its various positions. A fastener or cap nut 14 serves to secure the blade in place on a rotatable blade member 18. A hole 21 is provided for a lanyard or for hanging the tool on the hook of a tool board.

The rotatable member 18 rotates about a lateral axis of the handle 10 on a single bolt member 16. The outer end portion of bolt member 16 is threaded so that the cap nut 14 may be screwed onto the end of bolt member 16. Adjacent the head of bolt member 16 is cylindrical, bearing surface 19 which is finished to rotate freely in hole 44 such that bolt member 16 is freely rotatable as a unit with rotatable member 18, saw blade 12 and cap nut 14 relative to the head portion 40 of the handle 10. The bolt thus serves as both a shaft on which the member 18 rotates and a fastener for fastening the screw blade thereto.

Figure 2:
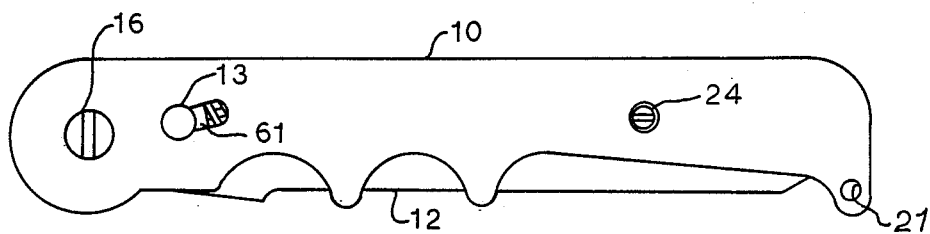
FIG. 2 is an elevational view showing the opposite side shown in FIG. 1, with the saw blade in a "closed" position.
Figure 4:
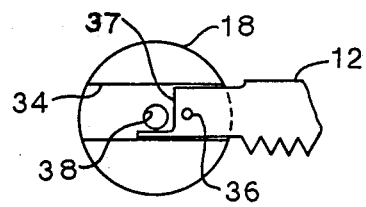
FIG. 4 is a sectional view taken along line 4—4 of FIG. 3, with the shank of a saw blade attached thereto.
Figure 7:
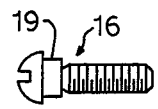
FIG. 7 shows a side view of the bolt member.
Figure 8:
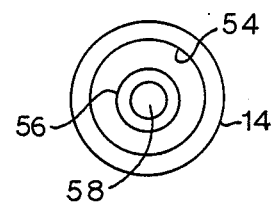
FIG. 8 is an inner side view of a fastener member.
Figure 9:
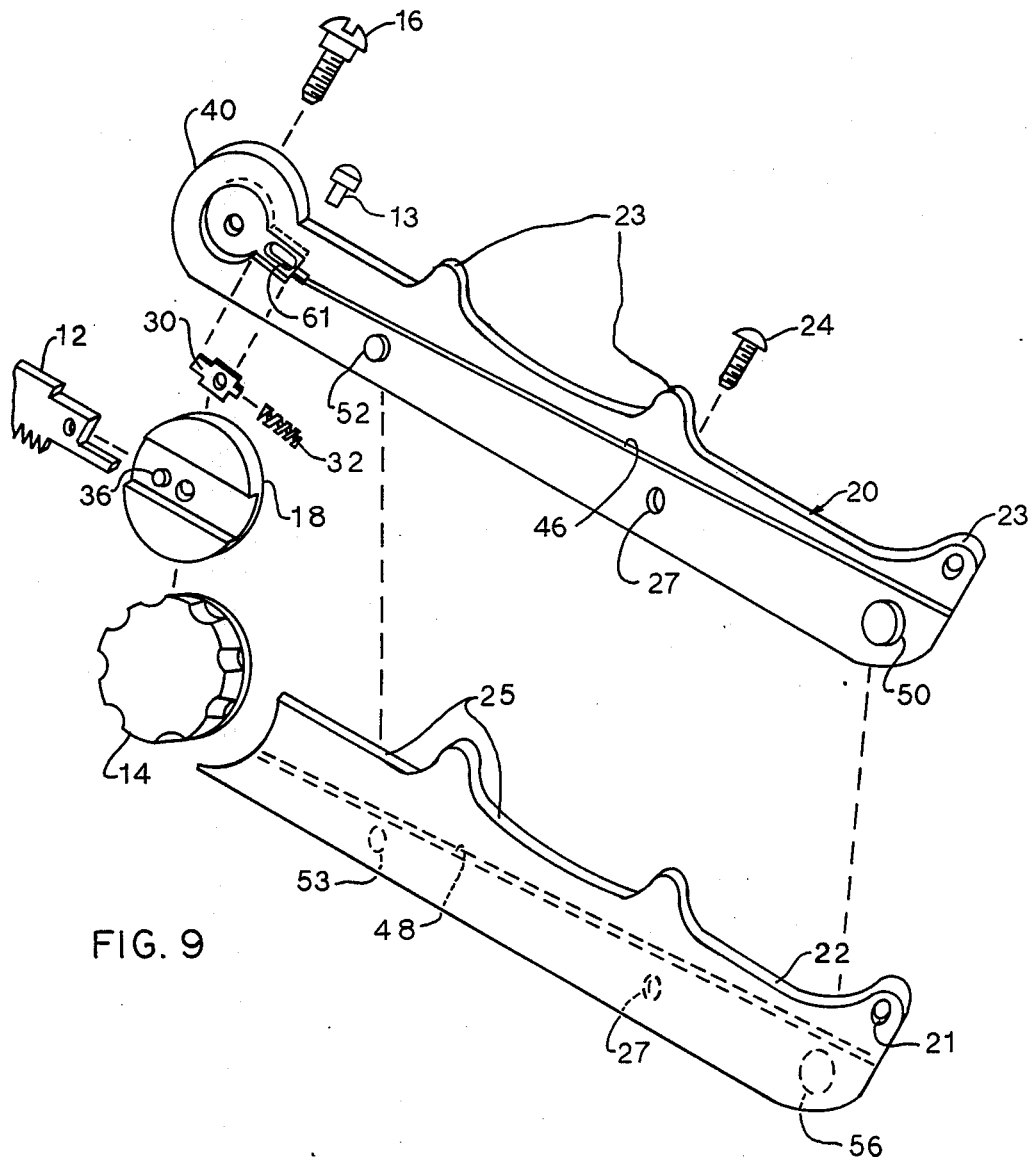
FIG. 9 shows an exploded view of the foldable pocket saw showing its construction.

In order to attach the saw blade 12 to the rotating member 18, said member has a transverse slot or recess 34 (See FIG. 4) in which the shank portion of the saw blade fits. Upstanding pin 36 is disposed in the slot and is adapted to fit in a corresponding hole formed in the saw blade adjacent the base of the saw blade. As shown in FIGS. 7, 8 and 9, when the shank of the saw blade is positioned within the recess of the rotatable member, the pin of the rotatable member engages the hole in the saw blade and the side edges of the blade engages the edges of the slot 34. A cutout 37 in the blade 12 provides clearance for hole 38 to receive the bolt 16. When the blade is positioned in the slot or recess 34, it is aligned to swing freely into and out of slot 17 in the handle. The cap nut 14 is then tightened onto the bolt member 16, both members having mating threaded portions. The tightening of the cap nut 14 firmly clamps the base of the saw blade 12 into solid contact with rotatable member 18. After being hand tightened, the cap nut 14, rotatable member 18, saw blade 12 and bolt member 16 are all rotatable together on bearing surface 19 in handle 10, as shown in FIGS. 1 and 2, upon release of the detent mechanism. Thus, the bolt serves a dual function which provides a simple but highly effective and economical construction.

The cap nut is of relatively large outer diameter approximately the same as that of rotatable member 18 and has a knurled outer edge for ease in tightening and untightening to change saw blades. The inner bore 58 of the cap nut 14 is threaded to engage with the bolt member 16 and, as shown in FIG. 8, there are two raised annular surfaces 54 and 56 for clamping against the shank portion of the saw blade at two spaced locations for securely mounting the blade on the rotatable member 18 without the use of tools.

Figure 5:
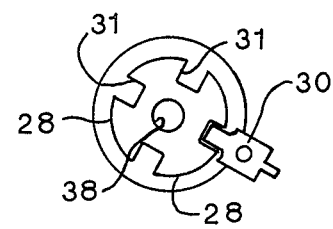
FIG. 5 is a sectional view taken along line 5—5 of FIG. 3.
Figure 6:
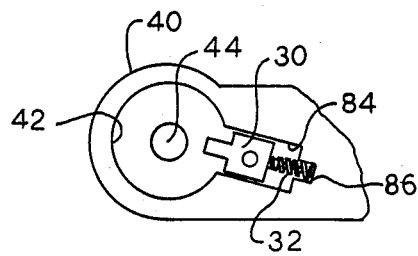
FIG. 6 is a partial side elevational view of the head portion of the handle showing part of the detent mechanism.

As seen in FIGS. 5 and 6, the rotatable member is a generally cylindrical disc which includes an axially extending hub 28 which rotatably fits into cylindrical recess 42 formed in the head portion 40 of handle 10. On the circumferential surface of the hub 28 is the plurality of radial, circumferentially spaced notches 31. A detent mechanism is disposed within the handle, as shown in FIG. 6, includes a pawl 30 and coil spring 32 which fit into recesses 84 and 86 which communicate with cylindrical recess 42. Spring 32 urges pawl 30 toward engagement with one of the notches 31 and when engaged therewith, prevents rotation of the member 18. The pawl 30 rides in recess 84 in the handle and is normally forced by spring 32 into contact with the rotatable member 18. The spring is disposed in recess 86. The inner end of actuator button 13 extends through slot 61 in handle portion 20 and is rigidly connected to the pawl 30.

Figure 3:
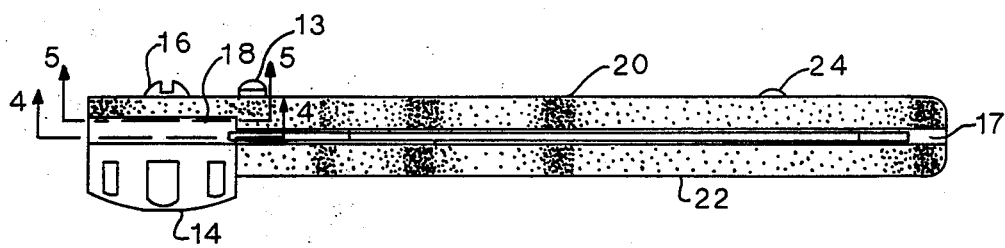
FIG. 3 is a plan view of the folding pocket saw.

Referring now to FIGS. 1 and 3, whenever it is desired to move the saw blade 12 to a new position, the actuator button 13 is moved rearwardly in slot 61, thereby moving the pawl 30 against the tension of spring 32 out of engagement with the notch 31 of the rotatable member. When the detent is removed from the notch, the saw blade rotatable member may be manually rotated by swinging the blade, itself, or by rotating cap nut 14. When the actuator button 13 is released, the detent spring will urge pawl 30 into engagement with the next notch 31 whereby the rotatable member and saw blade in the new position.

As shown in FIG. 9, handle 10 comprises two discrete portions 20 and 22. Shoulders or ridges 46 and 48 together form the bottom surface or floor of the groove 17 when the two-handle members are fastened together. The inner edge of handle portion 22 is curved about a radius which corresponds to the radius of cap nut 14. Whereas, handle part 20 includes mounting head or flange 40 for the blade mounting member 18. Studs or projections 50 and 52 extend from the inner surface of member 50 and are adapted to interfit with recesses 53 and 56 in member 22 to maintain the handle in its assembled condition when the two-handle members are fastened together. Bolt 24 enters threaded recess 27 in both handle members to connect the two-handle members.

The versatility of this invention is best illustrated in FIG. 1 wherein the three operative positions of the blade are shown at 90°, 180° and 270° relative to the handle for a variety of cutting tasks. Because of the detent mechanism, the blade will be positively locks in each position, as well as in its folded position within the handle.

Having thus described my invention what is claimed is:

1. A foldable pocket saw comprising a handle, a discrete rotatable member including a plurality of circumferentially spaced, radially extending notches in the periphery thereof rotatably disposed on a mounting head which extends outwardly of one end of the handle, a fastener for removably affixing a conventional saw blade onto said rotatable member, a spring actuated detent mechanism disposed within the handle and comprising a spring loaded pawl movable within the handle and in generally coplanar relationship with the rotatable member to engage selectively with one of the notches to prevent rotation of the rotatable member and thereby lock the saw blade in each of a plurality of positions relative to the handle.

2. A foldable pocket saw, as set forth in claim 1, in which the rotatable member is rotatable about the same fastener by which the saw blade is affixed on said rotatable member.

3. A foldable pocket saw, as set forth in claim 2, in which said fastener comprises a bolt having a threaded outer end and an unthreaded inner end portion disposed within an unthreaded bore in the mounting head so that the bolt is rotatable within said bore, said rotatable member being threaded and screw-fitted onto said bolt to rotate therewith, and a cap nut screw-fitted onto the outer end of said bolt to clamp a new blade onto said rotatable member.

4. A foldable pocket saw, as set forth in claim 3, in which said rotatable member includes a recess adapted to receive the inner end of the saw blade, said cap nut being adapted when screwed onto said fastener to clamp said saw blade in said recess.

5. A foldable pocket saw, as set forth in claim 4, in which said cap nut has an outer diameter approximately the same as the rotatable member and has a knurled outer ede for manual tightening and loosening thereof.

* * * * *